US012008650B1

(12) United States Patent
Frey

(10) Patent No.: US 12,008,650 B1
(45) Date of Patent: **\*Jun. 11, 2024**

(54) CUSTOMIZABLE EXCHANGE-TRADED CONTRACTS

(71) Applicant: Cboe Exchange, Inc., Chicago, IL (US)

(72) Inventor: Thomas Frey, Sarasota, FL (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,142

(22) Filed: May 4, 2023

Related U.S. Application Data

(63) Continuation of application No. 17/398,316, filed on Aug. 10, 2021, now Pat. No. 11,645,714.

(60) Provisional application No. 63/063,788, filed on Aug. 10, 2020.

(51) Int. Cl.
  *G06Q 40/04* (2012.01)
  *G06F 3/0482* (2013.01)
  *G06Q 30/0601* (2023.01)

(52) U.S. Cl.
  CPC ........... *G06Q 40/04* (2013.01); *G06F 3/0482* (2013.01); *G06Q 30/0621* (2013.01)

(58) Field of Classification Search
  CPC ... G06Q 40/04; G06Q 30/0621; G06F 3/0482
  See application file for complete search history.

(56) References Cited

U.S. PATENT DOCUMENTS

| 8,224,741 B2 * | 7/2012 | Maynard | G06Q 40/06 705/37 |
| 2006/0106708 A1 * | 5/2006 | Abushaban | G06Q 40/04 705/37 |
| 2007/0118459 A1 * | 5/2007 | Bauerschmidt | G06Q 40/00 705/37 |

FOREIGN PATENT DOCUMENTS

| EP | 3675024 A1 * | 7/2020 | G06Q 30/0633 |
| WO | WO-2009070690 A1 * | 6/2009 | G06Q 40/04 |

OTHER PUBLICATIONS

Fidelity Investments: Active Trader Pro User Guide, 2014, FMRLLC, pp. 1-20. (Year: 2014).*
De Carvalho, Cynthia H.: Cross-Border Securities Clearing and Settlement Infrastructure in the European Union as Prerequisite for Financial Market Integration: Challenges and Perspectives, 2004, Discussion Paper, Hamburg Institute of International Economics, pp. 1-58 (Year: 2004).*

(Continued)

*Primary Examiner* — Bijendra K Shrestha
(74) *Attorney, Agent, or Firm* — Fish & Richardson P.C.

(57) ABSTRACT

A method for trading a financial instrument via an exchange computing system includes receiving, from a user interface, data indicative of an order to trade the financial instrument, and one or more parameter values to customize parameters for the order, the parameters including at least one of a price, a quantity, an expiration time, a settlement time, an order type, a product type, a strategy identification, hedge information, an equity, and an index. The method includes adding one or more legs to the order, transmitting a request for clearing information associated with the one or more legs, receiving, from the user interface, data indicative of the clearing information including a matching level and a contra party, configuring the order, and executing the order by matching the order to an offer that satisfies the parameter values and the clearing information.

18 Claims, 7 Drawing Sheets

(56) References Cited

OTHER PUBLICATIONS

Chung et al.: Speed of Convergence to Market Efficiency in the ETFs Market, Dec. 11, 2011, Managerial Finance, vol. 30, No. 5, 2013, pp. 457-475 (Year: 2011).*
CME Group: Cleared OTC Financial Products: Security, Neutrality, Transparency, 2017, pp. 1-28 (Year: 2017).
Fidelity Investments: Active Trader Pro User Guide, 2001-2010, FMR LLC, pp. 1-194. (Year: 2010).
Zhang et al.: A Practical Guide to Hedging with Index Options, Sep. 24, 2018, pp. 1-11 (Year: 2018).

* cited by examiner

Confirm Order ✕

Agency

⟹ BUY 20 CALL OPEN $3,100.00 EXP: 2020-07-31

Acct: EXAMPLE-ACCTA GiveUp: 551 Range: CUSTOM QTY: 20

Contra

⟹ SELL 10 CALL OPEN $3,100.00 EXP: 2020-07-31

Acct: EXAMPLE-ACCTB GiveUp: 161 Range: FIRM QTY: 10

⟹ SELL 10 CALL OPEN $3,100.00 EXP: 2020-07-31

Acct: EXAMPLE-ACCTC GiveUp: 551 Range: FIRM QTY: 10

[ SEND ]  [ DISMISS ]

CUSTOMIZABLE EXCHANGE-TRADED CONTRACTS

CROSS-REFERENCE TO RELATED APPLICATIONS

This application is a continuation (and claims the benefit of priority under 35 USC 120) of U.S. patent application Ser. No. 17/398,316, filed Aug. 10, 2021, which claims the benefit of U.S. Provisional Patent Application No. 63/063,788, filed Aug. 10, 2020, both of which are incorporated herein by reference in their entirety.

TECHNICAL FIELD

This application relates to technology for trading financial instruments in electronic exchanges, including exchanges that combine electronic and open-outcry trading mechanisms.

BACKGROUND

High volumes of financial instruments such as derivatives, stocks, and bonds are continuously traded at electronic exchanges, which enable trades to occur in real time through the algorithmic processing of orders and associated market information. Generally, order execution refers to a process of accepting and completing an order for a financial instrument (e.g., buy order, sell order) that is received by an exchange. Market participants typically price their bids and offers based on market conditions, which are subject to rapid change, and electronic exchanges often match bids and offers based on price-time priority, and the principle of first-in, first-out (FIFO) (also known as first-come-first-served (FCFS)). Order execution occurs when the order is filled, and not necessarily when the account holder places the order. A trade may, for example, be executed when the price associated with a bid to purchase a financial instrument matches the price associated with an offer to sell the same instrument.

SUMMARY

The disclosure that follows relates to techniques implemented via an exchange computer system that enable market participants to customize parameters associated with their orders, such that the orders only execute when the customized parameters are met. These techniques enable the exchange computer system to provide greater control and flexibility to participating members with respect to order strategy and execution, and enhance the speed, efficiency, fairness, and quality of the trading processes executed through the system.

The techniques enable market participants to securely place orders for exchange-traded equities, indexes, or options via flexible user-customized options contracts that allow both the seller and buyer to negotiate various terms. By setting various parameters associated with an order, market participants are able to easily create new products, beyond those traditionally traded via an exchange computer system. The techniques are broker-neutral, and allow both buy-side and sell-side participants to quickly and easily trade. In addition to providing flexibility with respect to the market mechanism for executing the order, the techniques also provide flexibility to support individual traders and risk managers.

Among other advantages, the system promotes efficiencies in allowing users to customize orders to better suit their needs, and to provide more control over their transactions. In this and other ways, flexible user-customized options technology enhances the capabilities of the implementing exchange computer system by enabling users of that system to customize orders in ways that leverage the benefits of contracts with the advantages of exchange-based listings.

The exchange computer system can implement flexible user-customized options technology in a way that supports simple and complex trading strategies, and that is adaptable to the needs of market participants. For example, the system can support both single and multi-legged orders. Additionally, the system can provide functionality for single-sided auctions and crossing auctions, and can be integrated with other systems to provide a full range of functionality to market participants.

For example, the exchange computer system can provide access to an automated improvement mechanism (AIM) for paired orders of any origin type, which provides potential for price improvement and a participation right through an auction process. The exchange computer system can also provide access to a solicitation auction mechanism (SAM), an electronic crossing mechanism that allows an All-Or-None allocation to solicit, but not facilitate, contra orders (orders facilitating the buying and selling of the same shares without paying for them). Furthermore, the exchange computer system can support manual order handling of flexible user-customized options, allowing users to route orders to a floor broker or to a workstation for open outcry execution.

In one aspect, a method for trading a financial instrument via an exchange computer system includes receiving, from a user interface, data indicative of (i) an order to trade the financial instrument, and (ii) one or more parameter values to customize one or more parameters for the order, the one or more parameters including at least one of a price, a quantity, an expiration time, a settlement time, an order type, a product type, a strategy identification, hedge information, an equity, and an index. The method includes adding one or more legs to the order and transmitting a request for clearing information associated with the one or more legs. The method includes receiving, from the user interface, data indicative of the clearing information associated with the one or more legs, the clearing information including a matching level and a contra party. The method includes configuring the order based on the one or more legs and the data indicative of the order, the one or more parameter values, and the clearing information. The method includes executing the order by matching the order to an offer that satisfies the one or more parameter values and the clearing information.

One or more implementations can include the following features. For example, in some implementations, the user interface is a graphical user interface of the exchange computing system that is responsive to one or more user inputs.

In some implementations, transmitting a request for clearing information associated with the one or more legs includes displaying the request for clearing information within the user interface.

In some implementations, configuring the order based on the one or more legs and the data indicative of the order to trade the financial instrument, the one or more parameter values, and the clearing information includes formatting the order for electronic execution.

In some implementations, configuring the order based on the one or more legs and the data indicative of the order to trade the financial instrument, the one or more parameter values, and the clearing information includes formatting the order for manual execution.

In some implementations, adding one or more legs to the order is performed in response to receiving user input including data indicative of leg information. In some implementations, the user input is provided in the form of a spreadsheet file.

The details of one or more embodiments of the subject matter described in this specification are set forth in the accompanying drawings and the description below. Other potential aspects, features, and advantages will be apparent from the description, the drawings, and the claims.

BRIEF DESCRIPTION OF THE DRAWINGS

FIGS. 4A and 4B are diagrams illustrating examples of users placing flexible options orders.

FIGS. 5A and 5B are diagrams illustrating examples of user interface prompts displayed by a trading system that facilitates the placement of flexible options orders.

DETAILED DESCRIPTION

Figure 1:
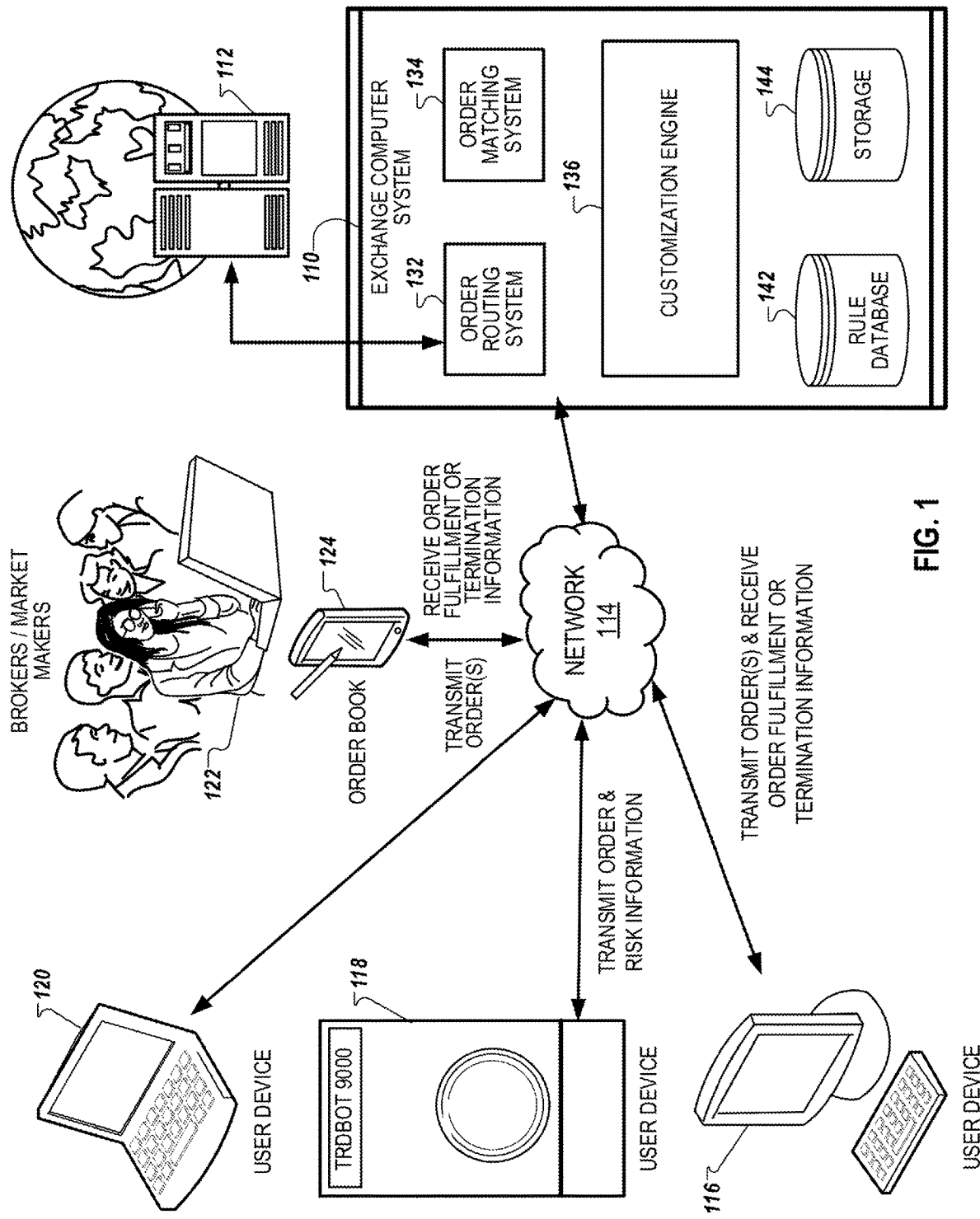
FIG. 1 is a diagram of an example of an exchange computer system that facilitates the placement and execution of user-customized orders, and the associated networks, devices, and users that make up an exemplary trading environment in which that system operates.

FIG. 1 is a diagram of an example of an exchange computer system that facilitates the placement and execution of user-customized orders, and the associated networks, devices, and users that make up an exemplary trading environment in which that system operates. Generally, the term "user" can refer to any entity that interacts with the exchange computer system and/or associated networks and devices. Users can include, for example, market makers and other market participants, brokers, institutional traders, individual traders, and automated trading systems. The diagram includes an exchange computer system 110, other exchanges 112, a network 114, user devices 116, 118, 120, market makers/brokers 122, and electronic order book 124.

The exchange computer system 110 can be implemented in a fully electronic manner. The exchange computer system 110 can receive orders from remote electronic devices. The financial instruments can include securities such as stocks, options, futures, or other derivatives associated with an underlying asset.

Network 114 can connect various components within the trading environment, and is configured to facilitate communications between those components. Network 114 can, for example, be configured to enable the exchange of electronic communications that include order and order fulfillment information between connected devices, such as an electronic order book 124 and the exchange computer system 110.

Network 114 can include one or more networks or subnetworks, each of which can include a wired or wireless data pathway. Network 114 can, for example, include one or more of the Internet, Wide Area Networks (WANs), Local Area Networks (LANs), or other packet-switched or circuit-switched data networks that are capable of carrying electronic communications (e.g., data or voice communications).

In some implementations, the network 114 can include a communications network inclusive of hardware and software implemented on various systems, devices, and components connected to network 114. In some implementations, trader information, such as a trader's speech and actions, can be recorded by a user device (e.g., a computer or portable device such as a cellular phone) at the location of the trader using sensors, cameras and microphones, and can be continuously transmitted across the network 114 to other devices connected to the network 114. These devices can include, for example, a customization engine 136 of the exchange computer system 110, which can be configured to gather information received from multiple market participants and customize orders associated with the multiple market participants.

A broker may execute an order based on a choice of markets. For example, for a stock that is listed on an exchange, a broker may direct the order to that exchange, to another exchange, or to a "market maker" who stands ready to buy or sell a stock listed on the exchange at publicly quoted prices. As another example, for a stock that trades in an over-the-counter (OTC) market, a broker may send the order to an "OTC market maker." In some instances, such as when a limit order is placed, a broker may route the order to an electronic communications network (ECN) that automatically matches buy and sell orders at specified prices. A broker may also "internalize" an order upon receipt, where the order is sent to another division of the broker's firm to be filled out of the firm's own inventory.

To protect communications between the various systems, devices, and components connected to network 114, network 114 can implement security protocols and measures such that data identifying order or bid information, or parties placing orders or quotes, can be securely transmitted. Network 114 can, for example, include virtual private networks (VPNs) or other networks that enable secure connections to be established with exchange computer system 110.

User devices 116, 118, and 120 can include portable or stationary electronic devices, such as smartphones, tablets, laptops, desktops, and servers that include user interfaces to display information and receive user input, and that are configured to communicate over a computer network. User devices 116, 118, and 120 can communicate with the exchange computer system 110 over network 114 using a proprietary protocol, or a message-based protocol such as financial information exchange (FIX), implemented over TCP/IP.

In some implementations, user devices 116, 118, and 120 can include displays for displaying representations of a trading platform. For example, the user devices 116, 118, and 120 can include or be coupled to graphical displays that include computer monitors. The user devices 116, 118, and 120 can include or be coupled to graphics engines and processors for processing high volumes of data to render information in real time.

User devices 116, 118, and 120 can transmit user input such as order information or risk information to the exchange computer system 110, and can also receive data from the exchange computer system 110 indicating that an order has been filled or canceled.

Users such as market makers/brokers 122 can also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, a customization engine 136, a database 142 of trading rules and algorithms, and storage 144. In some implementations, the exchange computer system 110 is a distributed computer system.

The order routing system (ORS) 132 determines whether a received order or quote is to be executed at the exchange computer system 110, or should instead be redirected to another exchange 112, and includes processing systems that enable the management of high data volumes. The ORS 132 can, for example, receive order or quote information for the purchase or sale of financial instruments from one or more user devices 116, 118, and 120.

Upon receiving an order or quote the ORS 132 determines if the destination specified in the received order or quote is the exchange computer system 110. If the exchange computer system 110 is not the destination, the ORS 132 forwards the order or quote to another exchange 112, which can be either the destination exchange, or an exchange en route to the destination exchange.

If the ORS 132 determines that the exchange computer system 110 is the destination of the received order or quote, the ORS 132 can forward the received order or quote to a matching system (OMS) 134.

The OMS 134 includes processing systems that analyze and manipulate orders according to matching rules stored in the database 142. The OMS 134 can also include an electronic book (EBOOK) of orders and quotes with which incoming orders to buy or sell are matched, according to the matching rules. The EBOOK can also be implemented in a separate database such as storage 144, which can include multiple mass storage memory devices for the storage of order and quote information. When the OMS 134 determines that a match exists for an order (for example, when a bid matches an offer for sale), the OMS 134 can mark the matched order or quote with a broker-specific identifier so that the broker sending the order or quote information can be identified.

Orders matched by OMS 134 can for example, originate from within a trading environment by the exchange computer system 110, from other components of the exchange computer system 110, and/or from systems that are connected to the exchange computer system 110.

The customization engine 136 can be implemented via the exchange computer system 110, and/or in another system that is connected to the exchange computer system 110 via network 114. The customization engine 136 can include hardware and software for enabling the exchange computer system 110 to identify customization information associated with orders for financial instruments and customize the execution of orders based on that information. For example, if an order for a financial instrument is customized to only trade under user-specified parameters, the exchange computer system can ensure that the order only trades when those parameters are met.

Storage 144 and database 142 store and handle data in a manner that satisfies the privacy and security requirements of the exchange computer system 110 and its users, and can store one or more of telemetric data, user profiles, user history, and rules and algorithms for matching quotes, bids, and orders. In some implementations, storage 144 may include a database utilized by customization engine 136.

Database 142 can store data that specifies the rules by which the exchange computer system 110 can operate, as well as specific rules for the operation of customization engine 136. For example, database 142 can include rules that determine a how to execute specific orders received by the exchange computer system 110 according to parameters associated with those orders. The database 142 can also store rules for executing customized orders by the exchange computer system 110. The database 142 can store information relating to order customization, including user-defined parameters relating to orders that have been placed.

The OMS 134 matches the buy side and sell side of a trade, and forwards the matched trade to a third party organization that verifies the proper clearance of the trade, such as the Options Clearing Corporation (OCC) where the securities can be options, or Depository Trust Company (DTC) where the securities can be equities. The OMS 134 can also format the quote and sale update information and send that information through an internal distribution system that refreshes displays, in addition to submitting the information to a quote and trade dissemination service such as, in the case of options, the Options Price Reporting Authority (OPRA). In the case of Equities, the information would be submitted to the Securities Information Processor (SIP). Upon completion of a trade, fill information for an order may also be passed through the OMS 134 and the ORS 132 to one or more user devices 116, 118, and 120.

Figure 2:
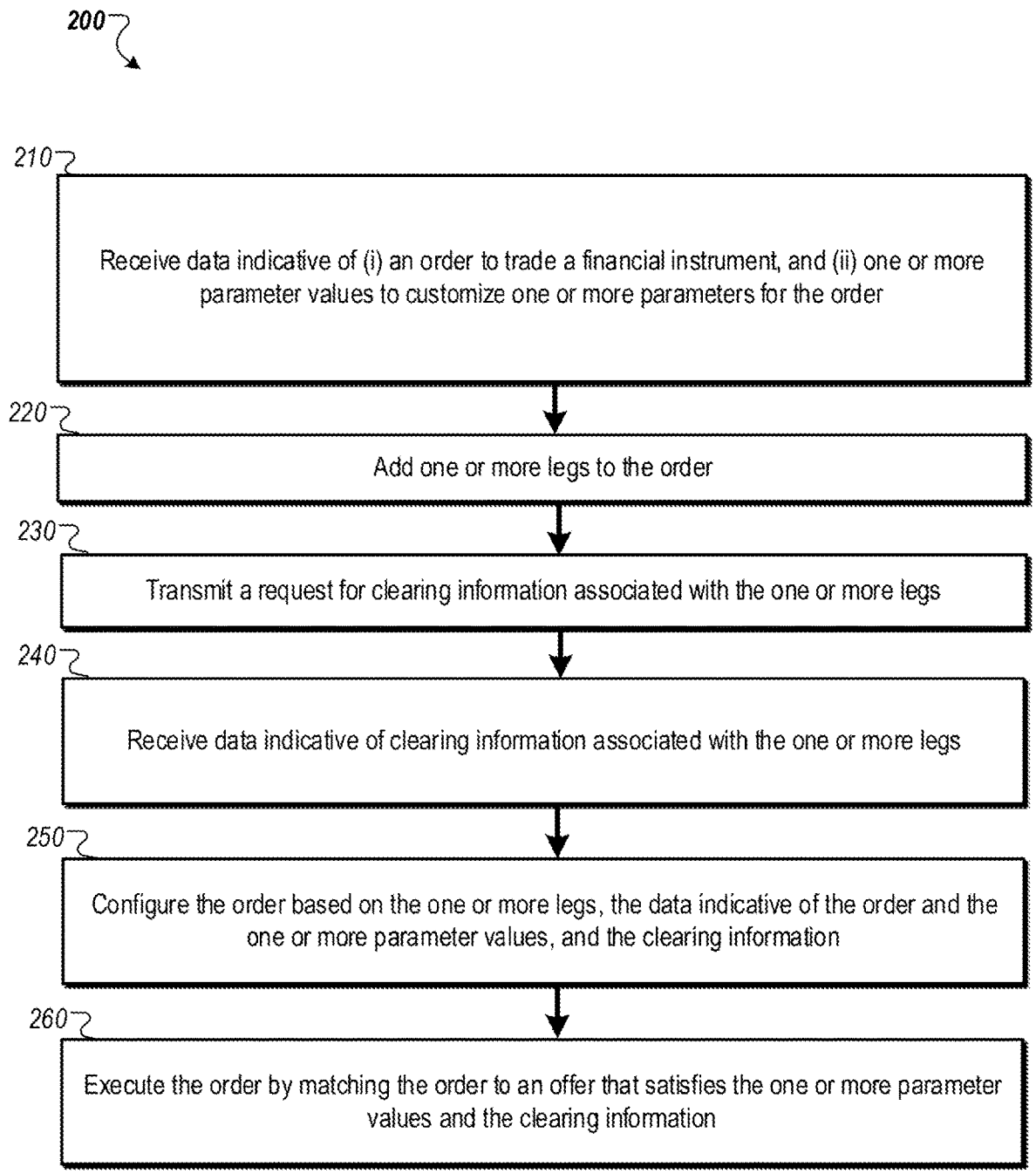
FIG. 2 is a flowchart of an example process for executing, via an exchange computer system, a financial instrument trade based on a user-customized order.

FIG. 2 is a flowchart of an example process 200 for executing, via an exchange computer system, a financial instrument trade based on a user-customized order. The process 200 can be performed, for example, by the exchange computing system 110 described with respect to FIG. 1 above. Briefly, the process 200 includes receiving, from a user interface, data indicative of (i) an order to trade the financial instrument, and (ii) one or more parameter values to customize one or more parameters for the order (210). The one or more parameters can include, for example, a price, a quantity, an expiration time, a settlement time, an order type, a product type, a strategy identification, and hedge information. The process 200 further includes adding one or more legs to the order (220); transmitting a request for clearing information associated with the one or more legs (230); receiving, from the user interface, data indicative of the clearing information associated with the one or more legs, the clearing information including a matching level and a contra party (240); configuring the order based on the one or more legs and the data indicative of the order to trade the financial instrument, the one or more parameter values, and the clearing information (250); and executing the order by matching the order to an offer that satisfies the one or more parameter values and the clearing information (260).

In more detail, the process 200 includes receiving, from a user interface, data indicative of an order to trade the financial instrument, and one or more parameter values to customize one or more parameters for the order (210). For example, the exchange computer system 110 can receive, from a user interface that is configured to communicate with the system 110, data indicating an order to trade a flexible user-customized contract with terms relating to ab exchange-listed equity or index. The contract may be tailored according to particular trading objectives and/or risk strategies. The data may, for example, include one or parameter values relating to a price, a quantity, an expiration time, a settlement time, an order type, a product type, a strategy identification, and hedge information. In some implementations, each of the parameters is defined and has a value. In some implementations, the parameter values may not be provided.

Examples of user interfaces that may be used to facilitate trading of flexible user-customized contracts, including order parameters and their values, are illustrated and described in further detail below with respect to FIGS. 3A, 3B, 4A, 4B, 5A, and 5B.

The process 200 includes adding one or more legs to the order (220). A leg is one part of a multi-part trade that allows a trader to combine multiple options. Legs are used in place of individual trades especially in complex strategies where multiple parts of the trade must be executed simultaneously. A leg can, for example, include the simultaneous purchase and sale of a security.

In one example, a user of the exchange computer system 110 can add 10 legs to the order specified in (210). The user can specify any number of legs, up to the maximum amount supported by the exchange computer system 110.

The process 200 includes transmitting a request for clearing information associated with the one or more legs (230). For example, exchange computer system 110 can transmit a request for clearing information associated with the legs specified by the user in (220) through the user interface. The request can include, for example, different prompts or fields for input such that a user can provide the requested information.

The process 200 includes receiving, from the user interface, data indicative of the clearing information associated with the one or more legs, the clearing information including a matching level and a contra party (240). For example, the user can input, through the user interface, data indicating a matching level and a contra party associated with the legs specified in (220). A contra party can be a party facilitating the buying and selling of the same shares.

The process 200 includes configuring the order based on the one or more legs and the data indicative of the order to trade the financial instrument, the one or more parameter values, and the clearing information (250). For example, the exchange computer system 110 can configure the order, preparing the order for execution either electronically or manually, based on the legs, the order parameters, and the clearing information provided. The exchange computer system 110 can communicate with existing trading exchanges, facilitating FLEX orders specified by users of the exchange computer system 110 according to standards and procedures as applied to other orders.

The process 200 includes executing the order by matching the order to an offer that satisfies the one or more parameter values and the clearing information (260). For example, the exchange computer system 110 provides the configured order for electronic processing to its order matching system 134. In some examples, if a user or setting specifies that an order should be executed manually, the exchange computer system 110 can configure the order for manual execution by a floor broker or workstation.

Figures 3A, 3B:
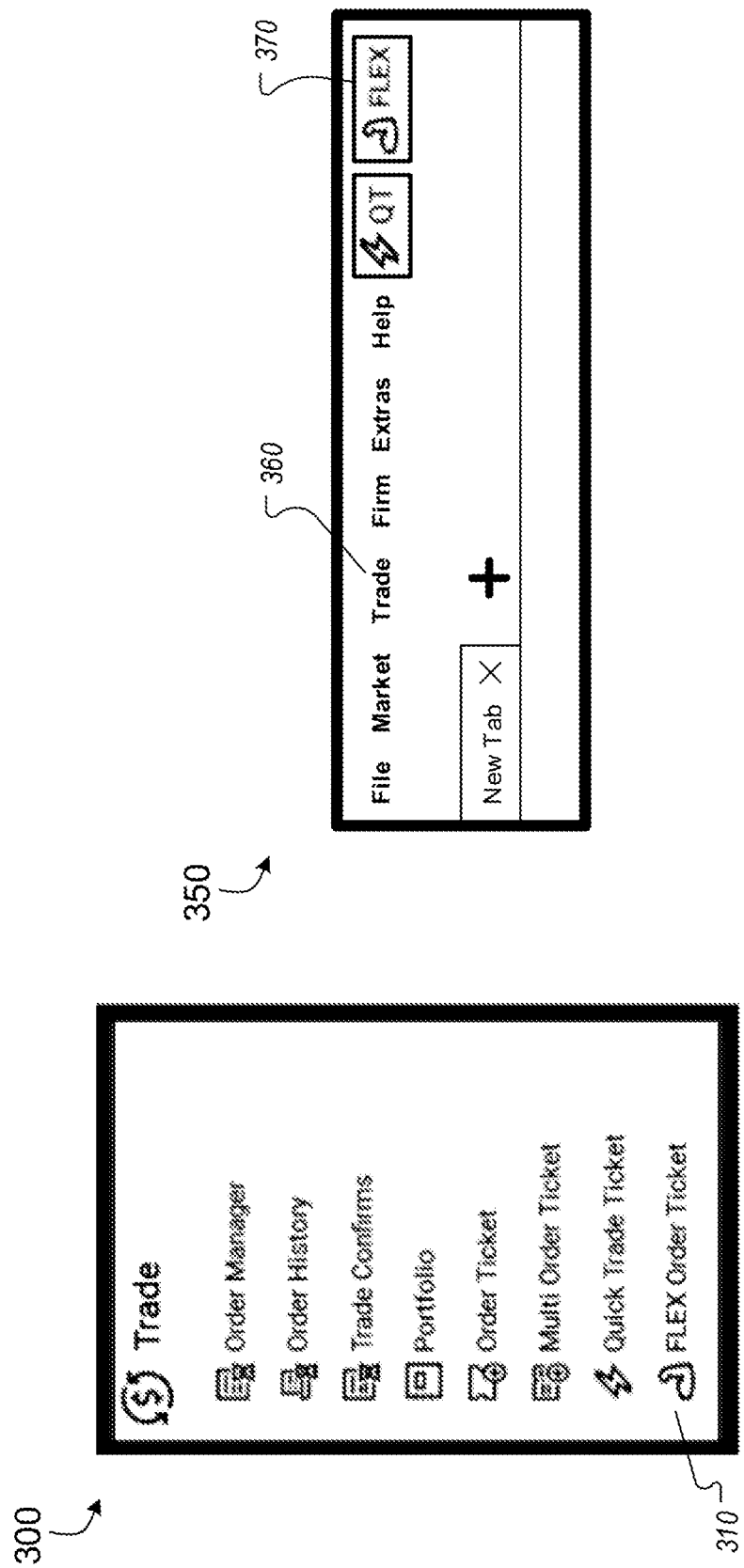
FIGS. 3A and 3B are diagrams illustrating examples of user interface elements displayed by a trading system that facilitates the placement of flexible options orders.

FIGS. 3A and 3B are diagrams illustrating examples of user interface elements displayed by a trading system that facilitates the placement of flexible options orders. These user interface elements allow a user to open a ticket that provides order data indicating an order and parameters associated with the order.

Referring initially to FIG. 3A, an example user interface 300 illustrates a menu of options available when a user selects the "Trade" menu within an example user interface that is configured to enable communication with exchange computer system 110. The user interface may, for example, be provided on user device 120. A user can select the "FLEX Order Ticket" option 310 from within the Trade menu in order to create a "FLEX ticket" that provides order data related to a user-customized flexible contract.

Referring now to FIG. 3B, a user can alternatively create a FLEX Order Ticket by selecting the Trade tab 360 within example user interface 350, or by selecting the FLEX button 370 within example user interface 350.

Figure 4A:
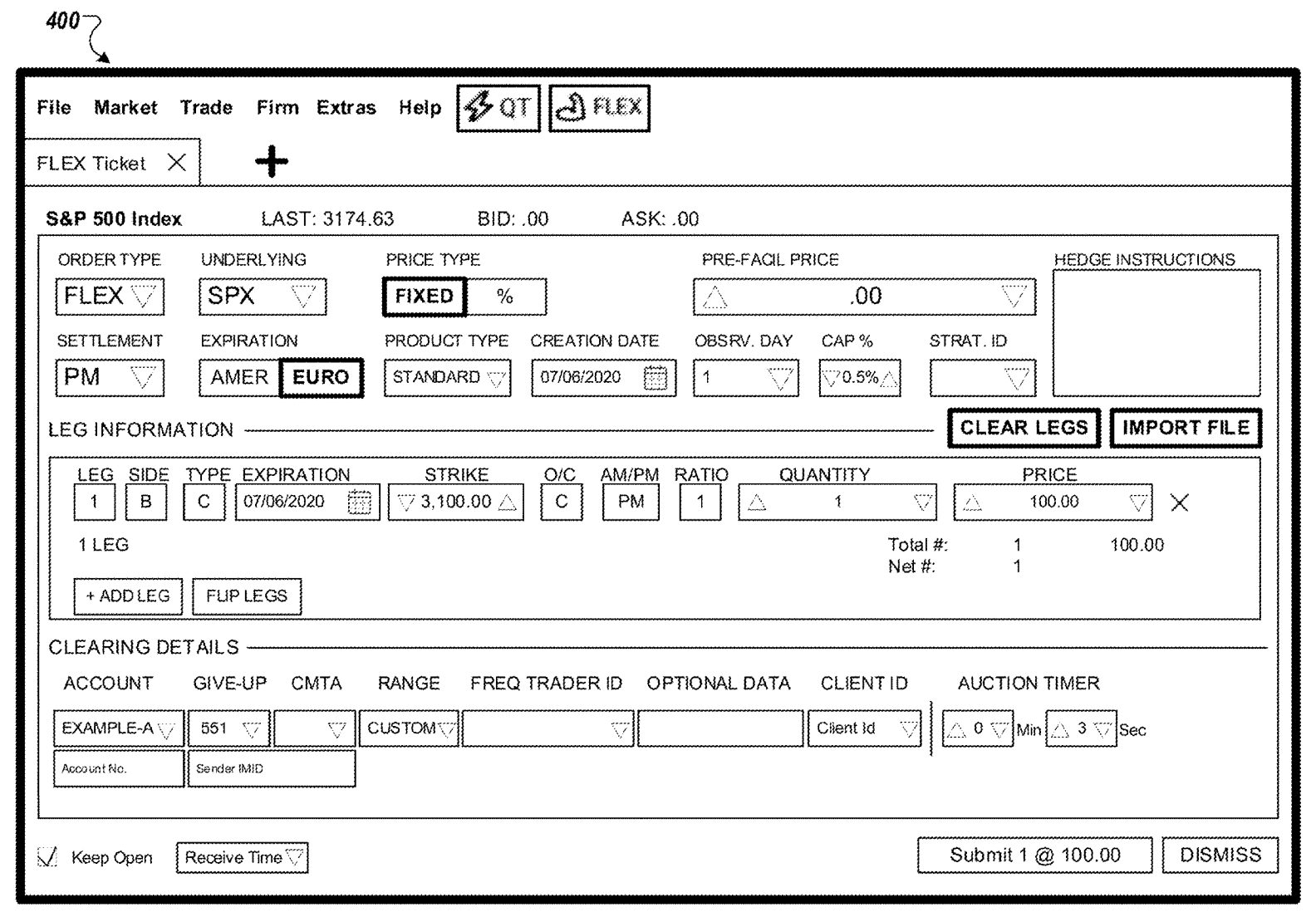
Figure 4B:
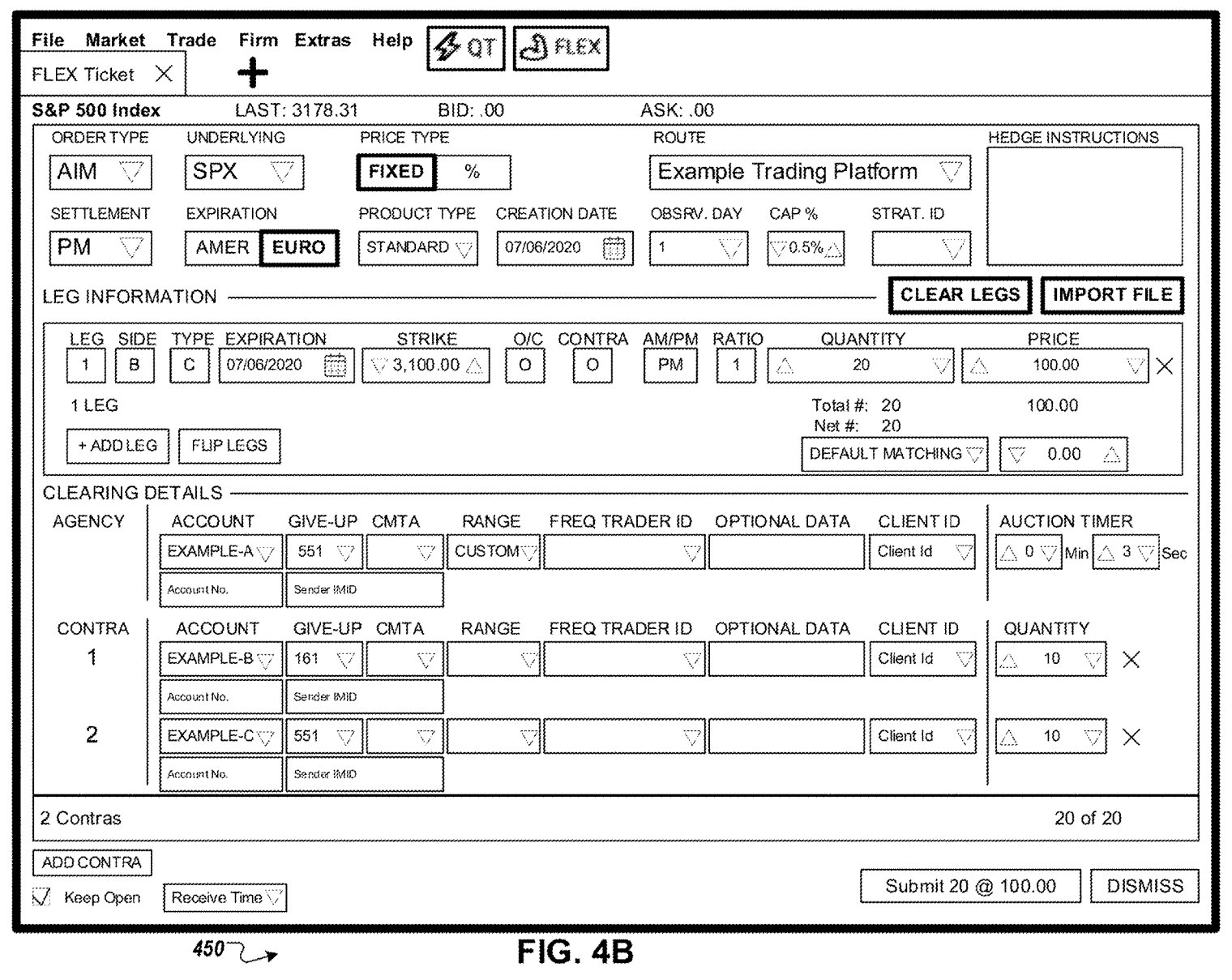

FIGS. 4A and 4B are diagrams illustrating examples of users placing a flexible options order. The example user interfaces 400 and 450 illustrate the various user interface elements and features available to a user when placing a flexible options order via the exchange computer system 110, as described above with respect to FIGS. 1, 2, 3A, and 3B. Referring initially to FIG. 4A, example user interface 400 illustrates a FLEX Ticket within the exchange computer system 110. The ticket includes fields for Order Type and Underlying. The Order Type field includes many options, including FLEX, AIM, and SAM. The Underlying field allows users to input their symbol, a code by which options are identified on an options exchange or a futures exchange. In some implementations, once the underlying symbol is provided, other fields in the ticket become available for customization.

In this particular example, "SPX," the symbol for S&P 500, is used as an example underlying. Other fields can then be customized, including Price Type, Route, Pre-Facil Price, Settlement, Expiration, Product Type, Creation Date, Observation Date, CAP %, Strategy ID, and Hedge Information. Each of these fields is accessible to a user to customize the FLEX order to specify key contract terms, including exercise prices, exercise styles, and expirations, on major stock indexes as well as individual equities.

Once the order fields are completed, users can add leg information, which specifies parameters of legs, including clearing information. For example, users can add information for various numbers of legs. In this particular example, users can add legs one at a time by clicking on the +Add Leg button at the bottom of the Leg Information window. In some implementations, if a leg is added using the +Add Leg button, the Strike and Price fields must be populated with a value greater than 0 before the order can be submitted. The user can also customize fields such as the Side, Type, Expiration, O/C, AM/PM, Ratio, and Quantity. In some implementations, the user can hover over a particular field available within the user interface 400 and a description of the required action can be provided through a pop-up window or other user interface element.

Once leg information is entered into the FLEX Ticket, the user can complete clearing details. For example, users can select the Account, Give-Up, CMTA, Range, Freq Trader ID, Optional Data, Client ID, and the Auction Timer. These fields can be setup and default values can be specified for a particular user or system by the exchange computing system 110. In some implementations, particular fields of the Leg Information and Clearing Details must be populated before the order can be submitted. For example, fields such as Strike, Price, Account, Give-Up, and Range must be populated before the order can be submitted.

Once the Clearing Details are provided and any required fields have been populated with valid values, the user can submit the order for the FLEX options by clicking Submit at the bottom right.

Once the user selects Submit, a Confirm Order window will appear to the user. For example, if the order is to be executed electronically, once the user sends the order, the order will be routed to a matching engine, such as order matching system 134 as described in FIG. 1. An example Confirm Order window is illustrated in FIG. 5A and described in further detail below.

Referring now to FIG. 4B, example user interface 450 illustrates an AIM FLEX Option order ticket within the exchange computer system 110. In example user interface 450, an AIM FLEX ticket is being created, and one difference includes the addition of a "Contra Matching" drop down menu. This menu allows a user to dictate the aggressiveness of participation of the contra party or parties. The Contra Matching menu can include multiple options for the aggressiveness of participation, including Default Matching, Auto-Match LMT, and Last Priority.

The user interface elements within interface 450 labelled similarly to those within user interface 400 function similarly, and the description of those elements is incorporated here.

Once a user has added legs to the AIM FLEX ticket using user interface 450, the Contra Matching option becomes available, and a user can provide Agency account information and add any contra parties. In some implementations, there is a limit to the number of contra parties that can be added for each order ticket. In this particular example, the limit is 10 contra parties for each ticket. In this particular example, the fields available for customization for each contra party is the same as the Agency account fields, with the addition of a "Quantity" field which allows a user to control the allocation of the quantity of the legs.

Once the Quantity has been allocated amongst contra parties and all required fields have been populated, the user can submit the order ticket.

In some implementations, a user can also create a SAM Type FLEX Option order ticket. The SAM Type ticket can provide a similar strategy to the AIM auction strategy, but the contra party allocation is considered "all-or-none," and therefore the user interface does not allow for the customization or specification of contra matching allocation.

Figure 5B:
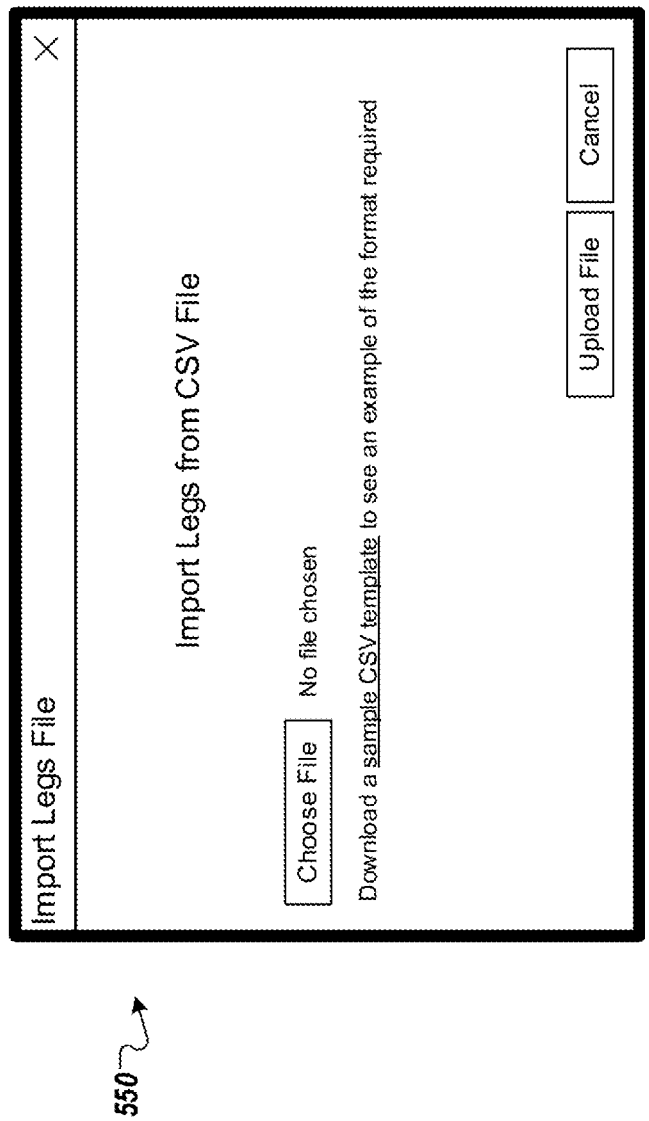

FIGS. 5A and 5B are diagrams illustrating examples of user interface prompts displayed by the trading system that facilitates the placement of flexible options orders. Referring initially to FIG. 5A, a user interface 500 illustrates an example pop-up window that appears to allow a user to confirm an order specified by the order data entered through the FLEX Option tickets as described above with respect to FIGS. 4A and 4B. The example pop-up window can provide order information, including the allocation of the contra parties. Once the user clicks Send, the order is provided for execution as described above.

Referring now to FIG. 5B, a user interface 550 illustrates the system's simple and intuitive workflow for inputting information such as legs in a complex strategy. The system allows legs to be imported using the Import File option at the top left of the Leg Information window, providing the convenience allowing users to choose their own method of importing order data in the most efficient and familiar way for the user. A user can select the "Import File" button within the user interface 400 or 450 as illustrated in FIGS. 4A and 4B to initiate the leg information importing process. The user interface 550 allows a user to download a "sample CSV template" to view the proper format for leg information, and/or "Choose File" in order to import a completed template with leg information. The user can submit the leg information for integration with the ticket by selecting the "Upload File" button.

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

What is claimed is:

1. A method to trade a financial instrument via an exchange computer system, comprising:

receiving, by the exchange computer system and from a user device, data indicative of (i) an order to trade the financial instrument, and (ii) one or more parameter values to configure the order;

adding, by the exchange computer system, one or more legs to the order;

transmitting, by the exchange computer system and to the user device, a request for clearing information corresponding to the one or more legs;

receiving, by the exchange computer system and from the user device, data indicative of the clearing information corresponding to the one or more legs;

configuring, by a customization engine of the exchange computer system, the order based on the one or more parameter values, and the data indicative of the clearing information; and executing the order, wherein the executing comprises matching, by an order matching system configured to match orders received through an order routing system of the exchange computer system, the order to an offer received from a second exchange computer system over a computer network connecting the exchange computer system and the second exchange computer system, and wherein the offer satisfies the one or more parameter values and the clearing information, and the second exchange computer system is different from the exchange computer system.

2. The method of claim 1, the method further comprising:

receiving, by a user interface, the data indicative of the order to trade the financial instrument and the one or more parameter values to configure the order, wherein the user interface is a graphical user interface of the exchange computing system that is responsive to one or more user inputs; and displaying the request for clearing information within the user interface.

3. The method of claim 2, wherein in response to executing the order, the user interface is configured to display a confirmation window comprising order information, wherein the order information indicates allocation of contra parties corresponding to the offer.

4. The method of claim 1, wherein configuring the order further comprises formatting the order based on a type of execution indicated in the one or more parameter values.

5. The method of claim 1, wherein adding one or more legs to the order is performed in response to receiving user input including data indicative of leg information and the user input is provided in a form of a data file comprising the data indicative of leg information.

6. The method of claim 1, wherein the data indicative of the clearing information comprises data related to contra parties corresponding to the offer, the data related to contra parties corresponding to the offer further comprising at least one of (i) an account, (ii) a clearing procedure type, (iii) a clearing member trading agreement, (iv) client identification, or (v) trader identification number.

7. A non-transitory computer-readable storage medium comprising instructions, which, when executed by one or more computer processors in an exchange computer system, cause the one or more computer processors to perform operations comprising:

receiving, by the exchange computer system and from a user device, data indicative of (i) an order to trade a financial instrument, and (ii) one or more parameter values to configure the order;

adding, by the exchange computer system, one or more legs to the order;

transmitting, by the exchange computer system and to the user device, a request for clearing information corresponding to the one or more legs;

receiving, by the exchange computer system and from the user device, data indicative of the clearing information corresponding to the one or more legs;

configuring, by a customization engine of the exchange computer system, the order based on the one or more parameter values, and the data indicative of the clearing information; and executing the order, wherein the executing comprises matching, by an order matching system configured to match orders received through an order routing system of the exchange computer system, the order to an offer received from a second exchange computer system over a computer network connecting the exchange computer system and the second exchange computer system, and wherein the offer satisfies the one or more parameter values and the clearing information, and the second exchange computer system is different from the exchange computer system.

8. The non-transitory computer-readable storage medium of claim 7, the operations further comprising:

receiving, by a user interface, the data indicative of the order to trade the financial instrument and the one or more parameter values to configure the order, wherein the user interface is a graphical user interface of the exchange computing system that is responsive to one or more user inputs; and displaying the request for clearing information within the user interface.

9. The non-transitory computer-readable storage medium of claim 8, wherein in response to executing the order, the user interface is configured to display a confirmation window comprising order information, wherein the order information indicates allocation of contra parties corresponding to the offer.

10. The non-transitory computer-readable storage medium of claim 7, wherein configuring the order further comprises formatting the order based on a type of execution indicated in the one or more parameter values.

11. The non-transitory computer-readable storage medium of claim 7, wherein adding one or more legs to the order is performed in response to receiving user input including data indicative of leg information and the user input is provided in a form of a data file comprising the data indicative of leg information.

12. The non-transitory computer-readable storage medium of claim 7, wherein the data indicative of the clearing information comprises data related to contra parties corresponding to the offer, the data related to contra parties corresponding to the offer further comprising at least one of (i) an account, (ii) a clearing procedure type, (iii) a clearing member trading agreement, (iv) client identification, or (v) trader identification number.

13. An exchange computer system comprising:

one or more processors and one or more storage devices storing instructions that are operable, when executed by the one or more processors, to cause the one or more processors to perform operations comprising:

receiving, by the exchange computer system and from a user device, data indicative of (i) an order to trade a financial instrument, and (ii) one or more parameter values to configure the order;

adding, by the exchange computer system, one or more legs to the order;

transmitting, by the exchange computer system and to the user device, a request for clearing information corresponding to the one or more legs;

receiving, by the exchange computer system and from the user device, data indicative of the clearing information corresponding to the one or more legs;

configuring, by a customization engine of the exchange computer system, the order based on the one or more parameter values, and the data indicative of the clearing information; and executing the order, wherein the executing comprises matching, by an order matching system configured to match orders received through an order routing system of the exchange computer system, the order to an offer received from a second exchange computer system over a computer network connecting the exchange computer system and the second exchange computer system, and wherein the offer satisfies the one or more parameter values and the clearing information, and the second exchange computer system is different from the exchange computer system.

14. The system of claim 13, the operations further comprising:

receiving, by a user interface, the data indicative of the order to trade the financial instrument and the one or more parameter values to configure the order, wherein the user interface is a graphical user interface of the exchange computing system that is responsive to one or more user inputs; and displaying the request for clearing information within the user interface.

15. The system of claim 14, wherein in response to executing the order, the user interface is configured to display a confirmation window comprising order information, wherein the order information indicates allocation of contra parties corresponding to the offer.

16. The system of claim 13, wherein adding one or more legs to the order is performed in response to receiving user input including data indicative of leg information and the user input is provided in a form of a data file comprising the data indicative of leg information.

17. The system of claim 13, wherein the data indicative of the clearing information comprises data related to contra parties corresponding to the offer, the data related to contra parties corresponding to the offer further comprising at least one of (i) an account, (ii) a clearing procedure type, (iii) a clearing member trading agreement, (iv) client identification, or (v) trader identification number.

18. The system of claim 13, the operations further comprising:

formatting the order based on a type of execution indicated in the one or more parameter values.

* * * * *